June 14, 1960 — E. PELL — 2,941,132
MOTOR-BRAKE CONTROL SYSTEMS
Filed Sept. 21, 1956 — 3 Sheets-Sheet 1

Inventor
Eric Pell
By H R Ratter
Attorney

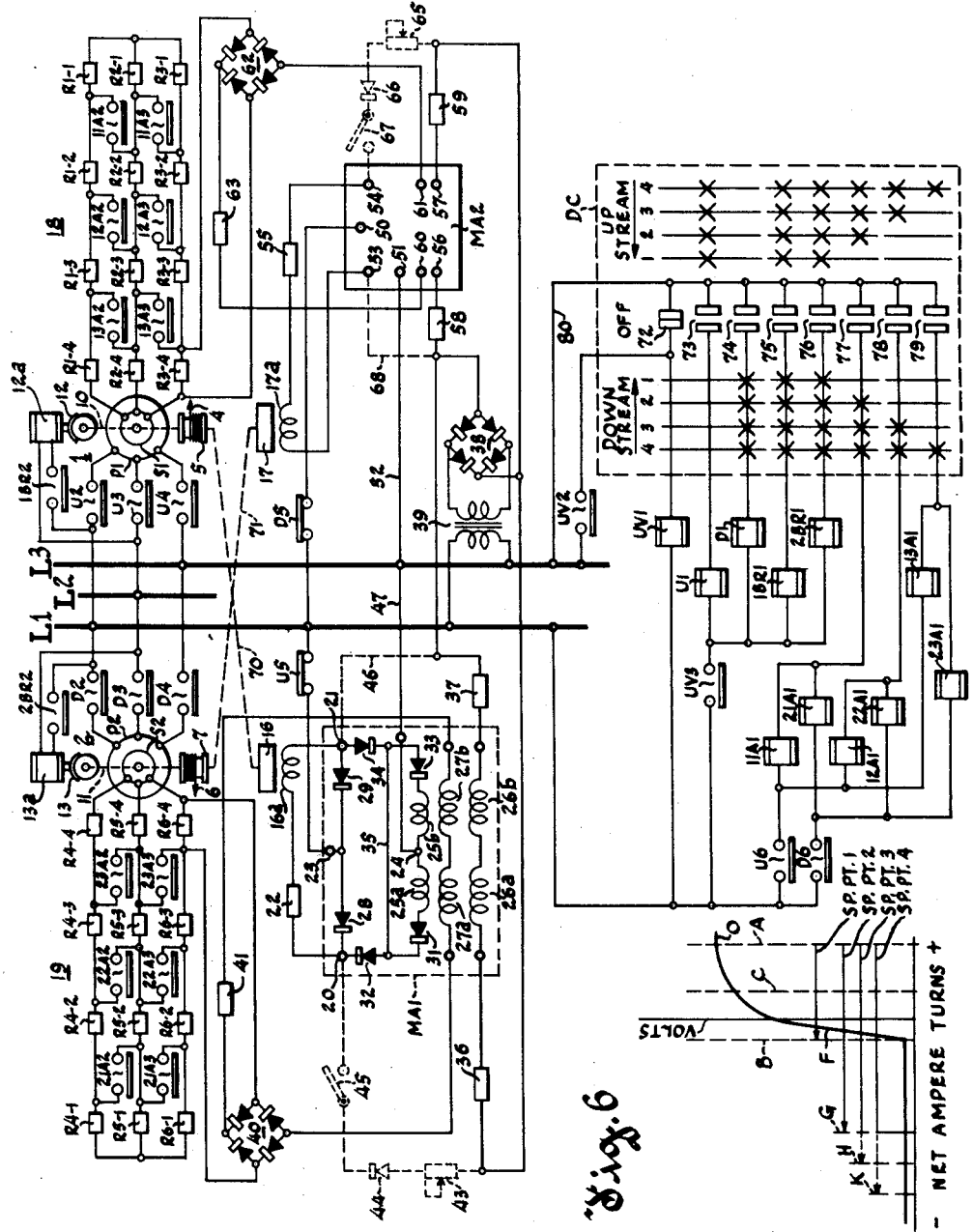

United States Patent Office 2,941,132
Patented June 14, 1960

2,941,132

MOTOR-BRAKE CONTROL SYSTEMS

Eric Pell, Wauwatosa, Wis., assignor to Cutler-Hammer, Inc., Milwaukee, Wis., a corporation of Delaware Filed Sept. 21, 1956, Ser. No. 611,297

16 Claims. (Cl. 318—7)

This invention relates to improvements in motor-brake control systems.

While not limited thereto, the invention is especially applicable to systems for mooring and positioning of a barge alongside a dock where it is subjected to strong river or tidal currents.

Eric Pell and Charles E. Smith Patent No. 2,823,341, granted July 5, 1957, and assigned to the assignee of the present application, discloses motor-brake systems applicable to hoists and employing a single alternating current induction motor having an electro-magnetic brake. Variable energization of the brake during operation of the motor is controlled by a magnetic amplifier receiving its control excitation from a commutatable motor secondary resistance network.

In order to haul a load forward and rearward in a horizontal plane, such as for example a barge alongside a dock, separate motors are required for hauling in forward and rear load-connected lines, respectively. During the hauling operations, it is desirable to automatically maintain both lines taut to prevent yawing and movement of the barge away from the dock and to preselect and regulate the speed of the barge. The aforementioned regulations must be accomplished to automatically maintain the preselected barge speed substantially constant against the force of an over-hauling river current.

Accordingly it is an object of the present invention to provide improved means affording the aforementioned and other control functions.

A more specific object of the invention is to provide improved means for automatically controlling energization of a rear-motor electro-dynamic brake as a function of a forward-motor speed or torque.

A still more specific object of the invention is to provide improved means for variably controlling such rear-motor brake energization through a selectively predetermined speed range at each speed point of the forward motor.

A further specific object of the invention is to provide improved means for cross-connection of the electro-dynamic brake control apparatus in a plural-motor control system.

Other objects and advantages of the invention will hereinafter appear.

While the apparatus hereinafter described is effectively adapted to fulfill the objects stated, it is to be understood that I do not intend to confine my invention to the particular preferred embodiment of control system disclosed, inasmuch as it is susceptible of various modifications without departing from the scope of the appended claims.

In the accompanying drawings:

Fig. 2 illustrates diagrammatically a motor control system constructed in accordance with the present invention;

Figure 5:
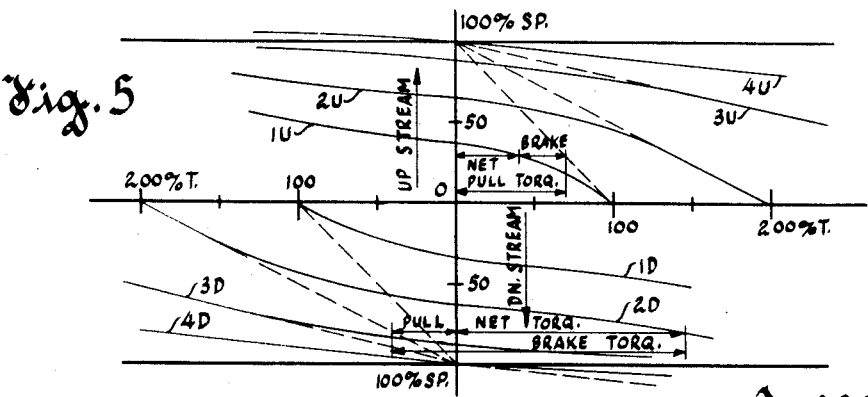

Fig. 5 graphically depicts speed-torque characteristics afforded by the control system of Fig. 2, and Fig. 6 graphically depicts operating characteristics of a magnetic amplifier employed in the control system of Fig. 2.

Figure 1:
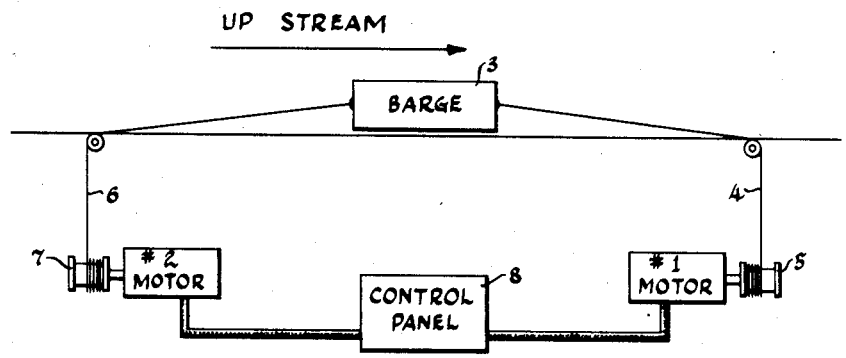
Fig. 1 is a schematic illustration of a barge hauling system embodying the invention.

As shown in the schematic illustration in Fig. 1, a pair of induction motors 1 and 2 are employed to haul a barge 3 upstream and downstream, respectively. Barge 3 is hauled upstream by operation of motor 1 to wind a line 4 on a drum 5 and downstream by operation of motor 2 to wind a line 6 on a drum 7. A control system for controlling motors 1 and 2 is indicated generally at 8. The speed of barge 3 is controlled during operation of one motor by braking the other motor as more fully described hereinafter.

Referring to Fig. 2 there is shown a pair of induction motors 1 and 2 for hauling the barge 3 as hereinbefore described in connection with Fig. 1. Drums 5 and 7 for winding and unwinding lines 4 and 6 are mounted on respective motor shafts 10 and 11. Mounted on corresponding first ends of the motor shafts are friction brakes 12 and 13 having electro-responsive release coils 12a and 13a and mounted on the other ends of the motor shafts are torque resisting or electro-dynamic brakes 16 and 17 having operating coils 16a and 17a, respectively. Such brakes may be of the electro-magnetic or magnetic particle type.

Figure 3:
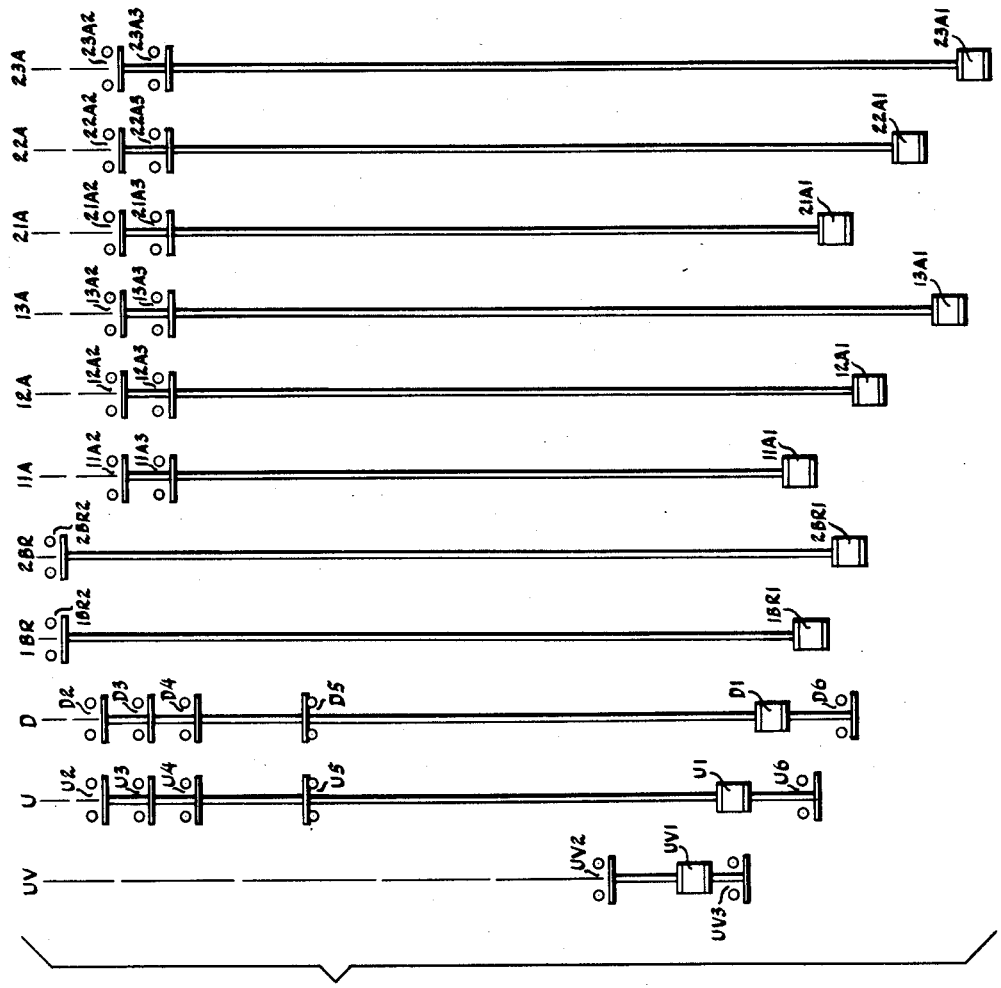
Fig. 3 is a schedule of contactors and relays shown in Fig. 2 with their respective contacts shown mechanically coupled to their operating coils.

When Fig. 3 is placed at the side of Fig. 2, the operating coils and contacts of the contactors and relays in the schedule will be in horizontal alinement with the corresponding coils and contacts in the circuit drawing to facilitate finding the same in the latter.

The primary windings P1 and P2 of motors 1 and 2 are supplied from a 3-phase alternating current power supply source (not shown) through power supply lines L1, L2 and L3 and normally-open contacts U2, U3 and U4 of an "upstream" contactor U or normally-open contacts D2, D3 and D4 of a "downstream" contactor D, respectively, the operation of contactors U and D being controlled by a conventional drum controller enclosed within the dotted line rectangle DC. Although conventional reversing contacts are employed in actual practice to energize the motor primary windings, only the forward contacts are required for the present disclosure.

Secondary windings S1 and S2 of motors 1 and 2 are connected to resistance networks 18 and 19, respectively, each network having three star-connected phase branches. One branch of network 18 comprises four series connected resistors R1-1 to R1-4, a second branch comprises four series connected resistors R2-1 to R2-4, and a third branch comprises four series connected resistors R3-1 to R3-4. Electro-responsive contactors 11A, 12A and 13A, energization of the operating coils of which is controlled by controller DC, are provided to effect commutation of resistance out of network 18 in incremental steps. Upon energization of any one of these contactors, their respective sets of contacts, which are similarly designated with the addition of postscripts "2" and "3" (for example 11A2 and 11A3), will close to effectively shunt out the resistors in the network to the right of each such set of contacts.

Similarly, one branch of network 19 comprises four series connected resistors R4-1 to R4-4, a second branch comprises four series connected resistors R5-1 to R5-4, and a third branch comprises four series connected resistors R6-1 to R6-4. Electro-responsive contactors 21A, 22A and 23A, energization of the operating coils of which is also controlled by controller DC, are provided to effect commutation of resistance out of network 19 in incremental steps. Upon energization of any one of the last mentioned contactors, their respective sets of contacts, which are similarly designated with the addition of postscripts "2" and "3" (for example 21A2 and 21A3), will close to effectively shunt out the resistors in the network to the left of each such set of contacts. The relative ohmic values of the resistors in networks 18 and 19 are selected to obtain the desired speed control hereinafter more fully described.

Operating coil 16a of brake 16 is connected to output terminals 20 and 21 of a self-saturating magnetic amplifier MA1 in series with a resistor 22. Amplifier MA1 comprises alternating current input terminals 23 and 24, alternating current main power windings 25a and 25b, direct current reference windings 26a and 26b and direct current signal windings 27a and 27b. Half-wave rectifiers 28 and 29 are connected between input terminal 23 and output terminals 20 and 21, respectively. Input terminal 24 at the common point between power windings 25a and 25b is connected through winding 25a and half-wave rectifiers 31 and 32 to output terminal 20 and through winding 25b and half-wave rectifiers 33 and 34 to output terminal 21. The junction of rectifiers 31 and 32 is connected through a conductor 35 to the junction of rectifiers 33 and 34. Reference windings 26a and 26b are connected together at one end and at their other ends through resistors 36 and 37 to the output terminals of a full-wave rectifier bridge 38. The input terminals of rectifier bridge 38 are connected to the secondary winding of a transformer 39 which has its primary winding connected across power supply lines L1 and L3. Signal windings 27a and 27b are connected together at one end and at their other ends across the output terminals of a full-wave rectifier bridge 40, one of the latter connections including a resistor 41 in series therewith. The input terminals of rectifier bridge 40 are connected across resistor R6–4 of secondary resistance network 19. Input terminal 23 is connected to power supply line L1 through normally-closed contacts U5 of the aforementioned contactor U while input terminal 24 is connected through conductor 47 to power supply line L3.

An optional arrangement may be provided by connecting an adjustable resistor 43, a half-wave rectifier 44 and a normally-open switch 45 in series between output terminal 20 and the junction of resistor 36 and rectifier bridge 38 and connecting output terminal 21 through a conductor 46 to the junction of resistor 37 and rectifier bridge 38. As hereinafter more fully described, the aforementioned optional arrangement shown in broken lines affords minimum braking torque at all times for motor 1. The aforementioned half-wave rectifiers in both the magnetic amplifier and the optional arrangement are so connected in circuit as to form the conducting paths hereinafter described.

A magnetic amplifier MA2 has an input terminal 50 connected through normally-closed contacts D5 of the aforementioned contactor D to power supply line L1 and an input terminal 51 connected through conductor 52 to power supply line L3. Output terminals 53 and 54 are connected through a resistor 55 to operating coil 17a of brake 17. Reference winding terminals 56 and 57 are connected through resistors 58 and 59, respectively, to the output terminals of the aforementioned rectifier bridge 38. Signal winding terminals 60 and 61 are connected across the output terminals of a rectifier bridge 62, one of the latter connections having a resistor 63 in series therewith. The input terminals of rectifier bridge 62 are connected across resistor R3–4 of the aforementioned secondary resistance network 18. An optional arrangement similar to that described in connection with magnetic amplifier MA1 may be provided by connecting an adjustable resistor 65, a half-wave rectifier 66 and a normally-open switch 67 in series between output terminal 54 and the junction of resistor 59 and rectifier bridge 38 and connecting output terminal 53 through a conductor 68 to the junction of resistor 58 and rectifier bridge 38. As hereinafter more fully described the aforementioned optional arrangement shown in broken lines affords minimum braking torque at all times for motor 2. Magnetic amplifier MA2 is identical in structure to magnetic amplifier MA1. Detailed description of magnetic amplifier MA2 is, therefore, omitted for the sake of simplicity.

As schematically depicted by broken lines 70 and 71, electro-dynamic brakes 16 and 17 are cross-connected to motor shafts 10 and 11, respectively. Thus, operation of motor 1 affords energization of brake operating coil 17a to brake motor 2 and, conversely, operation of motor 2 affords energization of brake operating coil 16a to brake motor 1.

In addition the control system comprises an under-voltage relay UV, a first brake relay 1BR and a second brake relay 2BR having energizing connections hereinafter to be described in conjunction with controller DC.

Controller DC is a conventional drum controller provided with eight pairs of contacts 72 through 79, respectively. Corresponding first contacts of each pair are connected to power supply line L3 through a conductor 80. Contacts 72 are closed in the "off" position of the controller and open in all other operating positions thereof. When contacts 72 are closed, an energizing circuit is completed for operating coil UV1 of relay UV across power supply lines L1 and L3 to close normally-open contacts UV2 which establish a holding circuit for coil UV1 shunting contacts 72 and to close normally-open contacts UV3 to prepare energizing circuits for operating coils U1, D1, 1BR1 and 2BR1 to be completed upon subsequent operation of controller DC. Contacts 73 through 79 of controller DC are open in the "off" position and are closed in the operating positions in the "Upstream" and "Downstream" directions as specifically indicated by an "x" for each such position on the layout development for the controller.

Contacts 73 of controller DC, when closed in each of the four operating positions in the "Upstream" direction, complete an energizing circuit for operating coil U1 of "Upstream" contactor U through the then-closed contacts UV3 of under-voltage relay UV. Coil U1 being thus energized closes contacts U2, U3 and U4 to connect the power supply source through lines L1–3 to primary winding P1 of motor 1 thereby to operate the latter in the "Upstream" direction. Opening of contacts U5 interrupts the connection from power supply line L1 to input terminal 23 of magnetic amplifier MA1 to prevent braking of motor 1. Closure of contacts U6 prepares energizing circuits for operating coils 11A1, 12A1 and 13A1 of accelerating contactors 11A, 12A and 13A to be completed upon subsequent operation of controller DC to "Upstream" operating positions 2, 3 and 4, respectively.

Contacts 74 of controller DC, when closed in all four operating positions in the "Downstream" direction, complete an energizing circuit for operating coil D1 of "Downstream" contactor D through the then-closed contacts UV3. Coil D1 being thus energized closes contacts D2, D3 and D4 to connect the power supply source through lines L1–3 to primary winding P2 of motor 2 thereby to operate the latter in the "Downstream" direction. Contactor D also opens its contacts D5 to interrupt the connection from power supply line D1 to input terminal 50 of magnetic amplifier MA2 to prevent braking of motor 2. Closure of contacts D6 prepares energizing circuits for operating coils 21A1, 22A1, and 23A1 of the aforementioned accelerating contactors 21A, 22A and 23A to be completed upon subsequent operation of controller DC to "Downstream" operating positions 2, 3 and 4, respectively.

Contacts 75 and 76 of controller DC are closed in all operating positions in the "Upstream" and "Downstream" directions of the latter to complete energizing circuits for operating coils 1BR1 and 2BR1 of brake relays 1BR and 2BR, respectively, through the then-closed contacts UV3. Coil 1BR1 being thus energized closes contacts 1BR2 to complete an energizing circuit for brake release coil 12a of friction brake 12 to release the latter. Energization of coil 2BR1 effects closure of contacts 2BR2 to complete an energizing circuit for brake release coil 13A of friction brake 13 to release the latter.

Contacts 77 of controller DC are closed in the second through fourth operating positions in the "Upstream" direction to complete an energizing circuit for operating coil 11A1 of contactor 11A through the then-closed contacts U6 of contactor U. Energization of coil 11A1 effects closure of contacts 11A2 and 11A3 to shunt effectively out of circuit resistors R1–1, R2–1 and R3–1 to the right thereof in secondary resistance network 18. Contacts 77 are closed also in the second through fourth operating positions in the "Downstream" direction of controller DC to complete an energizing circuit for operating coil 21A1 of contactor 21A through the then-closed contacts D6 of contactor D. Energization of coil 21A1 effects closure of contacts 21A2 and 21A3 to shunt effectively out of circuit resistors R4–1, R5–1 and R6–1 to the left thereof in secondary resistance network 19.

Contacts 78 of controller DC are closed in the third and fourth operating positions of the latter in both the "Upstream" and "Downstream" directions to complete an energizing circuit for operating coil 12A1 or 22A1 through the then-closed contacts U6 or D6, respectively. Energization of coil 12A1 effects closure of contacts 12A2 and 12A3 to shunt effectively out of circuit all resistors to the right thereof in secondary resistance network 18, while energization of coil 22A1 effects closure of contacts 22A2 and 22A3 to shunt effectively out of circuit all resistors to the left thereof in secondary resistance network 19.

Contacts 79 of controller DC are closed in the fourth operating position of the latter in both the "Upstream" and "Downstream" directions to complete an energizing circuit for operating coil 13A1 or 23A1 through the then-closed contacts U6 or D6, respectively. Energization of coil 13A1 effects closure of contacts 13A2 and 13A3 to shunt effectively out of circuit all resistors to the right thereof in secondary resistance network 18, while energization of coil 23A1 effects closure of contacts 23A2 and 23A3 to shunt effectively out of circuit all resistors to the left thereof in secondary resistance network 19.

In the event of a drop in voltage on the power supply lines, under-voltage relay UV will drop out to open contacts UV2 and UV3, thereby providing under-voltage protection in a well known manner. Opening of the aforementioned contacts will release all the then-energized contactors and relays including friction brake coils 12a and 13a, thereby requiring operation of controller DC to its "off" position before motors 1 and 2 can again be operated. The inclusion of normally-open contacts U6 in the energizing circuits for accelerating contactors 11A, 12A and 13A insures that secondary resistance cannot be shunted out of network 18 until contactor U has been energized to apply power to the primary winding of motor 1. Similarly, the inclusion of normally-open contacts D6 in the energizing circuits of accelerating contactors 21A, 22A and 23A insures that secondary resistance cannot be shunted out of network 19 until contactor D has been energized to apply power to the primary winding of motor 2.

Figure 4:
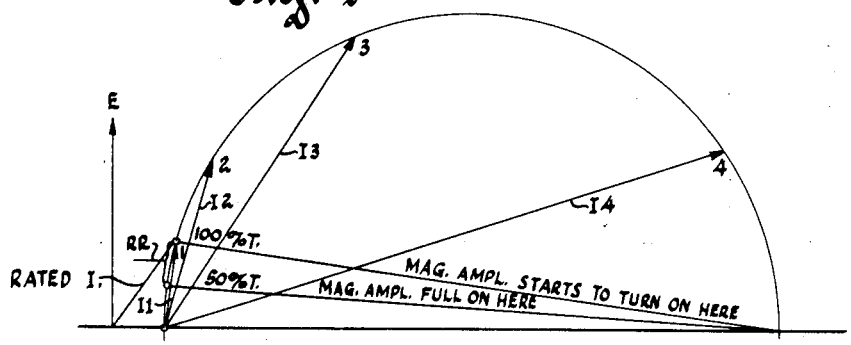
Fig. 4 is a circle diagram depicting in graphic form eddy current brake energization for different values of motor speed afforded by the control system of Fig. 2.

Referring to Fig. 4 there is shown a circle diagram for an induction motor wherein vector E represents the voltage per phase, vector I represents the input or rated current, and vectors 11, 12, 13 and 14 represent the variable values of secondary current, respectively, for speed points 1, 2, 3 and 4 corresponding to the four operating positions of controller DC in either the "Upstream" or "Downstream" directions. RR depicts the range of secondary current or motor torque at which the magnetic amplifier energizes the electro-dynamic brake. It will be noted that the brake regulation range extends over 50 percent of the speed range from 100 percent torque to 50 percent torque with full amplifier output at approximately 50 percent rated secondary current on speed point 1. On speed point 2, the zero speed current is approximately 200 percent and regulation is obtained over 25 percent of the speed range from 50 to 75 percent speed as indicated on the circle diagram. On the third and fourth speed points regulation is obtained over approximately 10 and 5 percent of the speed ranges from 75 to 85 and 90 to 95 percent speeds, respectively.

From the foregoing it will be apparent that barge speed is regulated by the forwardly-operated motor speed controlling the energization of the rear motor electro-dynamic brake. Thus, an increase in speed and a reduction in the forwardly-operated motor torque by the overhauling river current will automatically increase the braking torque of the rear motor. It may be assumed that no braking torque is developed at a forward torque of approximately 100 percent of more. However, if the aforementioned optional arrangement shown in dotted lines in Fig. 2 is used, closure of the appropriate switch 45 or 67 will effect energization of the respective coil 16a or 17a across the output terminals of rectifier bridge 38 to afford minimum braking torque at all times.

In all of the four operating positions of controller DC in the "Upstream" direction the signal windings of amplifier MA2 will be supplied through rectifier bridge 62 with a rectified alternating current which is proportional to the secondary current of motor 1. Similarly, in all of the four operating positions of controller DC in the "Downstream" direction the signal windings 27a and 27b of amplifier MA1 will be supplied through rectifier bridge 40 with a rectified alternating current which is proportional to the secondary current of motor 2. Magnetic amplifiers MA1 and MA2 operate in an identical manner during "Downstream" and "Upstream" operations, respectively. Detailed description of the operation of amplifier MA2 is, therefore, omitted hereinafter for the sake of simplicity.

The control system is operated in the "Downstream" direction in the manner hereinafter described. When power is supplied to lines L1–3, operating coil UV1 energizes through contacts 72 and conductor 80 and closes contacts UV2 to complete the aforementioned holding circuit for coil UV1. Closure of contacts UV3 prepares energizing circuits for operating coils U1, D1, 1BR1 and 2BR1 to be completed as hereinafter described. The voltage across supply lines L1 and L3 is applied to power winding 25b of amplifier MA1 through contacts U5, input terminal 23, rectifier 28, terminal 20, resistor 22, coil 16a, terminal 21, rectifiers 34 and 33, power winding 25b, terminal 24 and conductor 47; and to power winding 25a through conductor 47, winding 25a, rectifiers 31 and 32, terminal 20, resistor 22, coil 16a, terminal 21, rectifier 29, terminal 23 and contacts U5. The voltage across supply lines L1 and L3 is also applied to the bias windings of amplifier MA1 through transformer 39 and the positive terminal of rectifier bridge 38, resistor 36, windings 26a and 26b and resistor 37 to the negative terminal of bridge 38.

It may be assumed that the sum of the fixed ampere turns developed by the aforementioned energization of power windings 25a and 25b and bias windings 26a and 26b biases the amplifier full on. Thus, the value of ampere turns developed by bias windings 26a and 26b is so adjusted that the variation in ampere turns developed by signal windings 27a and 27b required to vary the output of amplifier MA1 between minimum and maximum corresponds to a variation in motor secondary current between 100% and 50% rated value. In other words, at or above 100% rated motor secondary current the output of amplifier MA1 will be held at a minimum, will vary between minimum and maximum output in accordance with variation in motor secondary current between 100% and 50% rated value, as the speed increases, and at 50% rated motor secondary current or below its output will be at maximum value. As depicted on curve "O" of Fig. 6, the intersection of broken line "A" with such curve corresponds to a condition wherein the power and bias windings are energized and the signal windings are not energized, the intersection of broken line "B" with such curve corresponds to a condition of 100% rated secondary current being applied to the signal windings, and the intersection of broken line "C" with such curve corresponds to a condition of 50% rated secondary current being applied to the signal windings. Therefore, the substantially straight portion "F" of curve "O" between lines "B" and "C" defines the regulating range of the amplifier.

Upon operation of controller DC to the first "Downstream" operating position, its contacts 72 open to place the system under control of under-voltage relay UV as hereinbefore described and contacts 74, 75 and 76 close to complete energizing circuits for operating coils D1, 1BR1 and 2BR1 through the then-closed contacts UV3. Contacts D2, D3 and D4 close to apply power to primary winding P2 of motor 2, contacts D5 open to prevent braking of motor 2 and contacts D6 close to prepare energizing circuits for the operating coils of commutating contactors 21A, 22A and 23A to be completed upon further operation of controller DC. Contacts 1BR2 close to energize operating coil 12a of friction brake 12 to release the latter and contacts 2BR2 close to energize operating coil 13a of friction brake 13 to release the latter. Primary winding P2 thus being energized, motor 2 starts with all the resistors effectively included in the secondary network. It may be assumed that 100% rated value of secondary current (I1, Fig. 4), flows in the phase of network 19 connected to the signal windings of amplifier MA1 at zero speed. Regulation is, therefore, obtained immediately on speed point 1. Thus, as the motor secondary current decreases with increase in speed, the output of amplifier MA1 increases as shown by the aforementioned substantially straight portion of curve "O" in Fig. 6 to correspondingly increase the energization of brake 16 of motor 1. Accordingly, the resultant speed-torque characteristic for the motor-brake system will be similar to that depicted by curve 1D of Fig. 5.

Upon operation of controller DC to the second "Downstream" operating position, its contacts 77 close to complete an energizing circuit for operating coil 21A1 of commutating contactor 21A through the then closed contacts D6 of contactor D. Contactor 21A being thus energized closes its contacts 21A2 and 21A3 to shunt resistors R4–1, R5–1 and R6–1 effectively out of secondary resistance network 19. It may be assumed that the values of the secondary resistors are selected so that the secondary current on speed point 2 of controlled DC is approximately 200% rated value at zero speed. The aforementioned secondary current flows through signal windings 27a and 27b of amplifier MA1 to develop a value of net ampere turns corresponding to the intersection of broken line "G" with curve "O" in Fig. 6. Thus, regulation is obtained between 50 and 75% speed as hereinbefore described in connection with the circle diagram of Fig. 4. Accordingly, the speed-torque characteristic of the motor-brake system will change so that the resultant characteristic will be like that depicted by curve 2D in Fig. 5.

Upon operation of controller DC to the third "Downstream" operating position, its contacts 78 close to complete an energizing circuit for operating coil 22A1 of commutating contactor 22A through the aforementioned contacts D6. Contactor 22A being thus energized closes its contacts 22A2 and 22A3 to additionally shunt resistors R4–2, R5–2 and R6–2 effectively out of secondary network 19. It may be assumed that the relative values of the effective secondary resistors are such as to develop a zero speed value of secondary current on speed point 3 of controller DC productive of net ampere turns in amplifier MA1 corresponding to the intersection of broken line "H" with curve "O" in Fig. 6. The aforementioned action affords regulation between 75 and 85% speed and the speed-torque characteristic will change to a resultant characteristic such as depicted by curve 3D in Fig. 5.

Upon operation of controller DC to the fourth and last "Downstream" operating position, its contacts 79 close to complete an energizing circuit for operating coil 23A1 of commutating contactor 23A through the aforementioned contacts D6. Contactor 23A being thus energized closes its contacts 23A2 and 23A3 to additionally shunt resistors R4–3, R5–3 and R6–3 effectively out of secondary network 19. It may be assumed that the values of the secondary resistors thus shunted relative to those remaining in circuit are such as to develop a zero speed value of secondary current on speed point 4 of controller DC productive of net ampere turns in amplifier MA1 corresponding to the intersection of broken line "K" with curve "O" in Fig. 6. The aforementioned action affords regulation between 90 and 95% speed and changes the speed-torque characteristic of the motor-brake system to a resultant characteristic such as depicted by curve 4D in Fig. 5.

When controller DC is returned to its "Off" position, contacts 73—79 open to de-energize all of the then-energized contactors and relays except under-voltage relay UV. Controller DC may now be operated progressively to operating positions 1, 2, 3, and 4 in the "Upstream" direction to control motor 1 and brake 17 of motor 2 through magnetic amplifier MA2 in a manner similar to the hereinbefore described operation of motor 2 and brake 16 of motor 1 through magnetic amplifier MA1 in the "Downstream" direction. The resultant speed-torque characteristics for the motor-brake system for operating positions 1, 2, 3 and 4 of controller DC in the "Upstream" direction will be such as depicted by curves 1U, 2U, 3U and 4U, respectively, in Fig. 5.

The divisions of pulling torque, braking torque and net handling torque are also depicted in Fig. 5 for speed point 1 in the "Upstream" direction and speed point 2 in the "Downstream" direction.

I claim:

1. In a system for hauling a load in either of two different directions, the combination with a pair of induction motors each having connected thereto a commutatable secondary resistance network and an electro-dynamic brake having an energizing winding, and means for initiating operation of one of said motors and acceleration thereof to a predetermined speed, of means associated with the secondary resistance network of and responsive to the speed of said one motor for variably energizing the brake winding of the other motor.

2. The combination according to claim 1 wherein the last mentioned means comprises amplifier means for variably energizing said brake winding of said other motor through a predetermined speed range of said one motor.

3. In a motor-brake system comprising a pair of induction motors each having a commutatable secondary resistance network and an electro-dynamic brake including an energizing winding therefor, means selectively operable to establish power connections to one or the other of said motors and commutate their secondary resistances in a predetermined sequence, amplifying means having output terminals respectively connected to the energizing winding of each of said brakes and having input terminals respectively connected to be subjected to a voltage varying as a function of secondary current of the motor associated with the other brake, and means responsive to operation of the first mentioned means for rendering the amplifying means having its input terminals subjected to a voltage varying with the secondary current of the power connected motor active and rendering the other amplifying means inactive.

4. In a motor-brake control system for operating a first motor and simultaneously braking a second motor, control circuit means for initiating operation of a selected one of the motors comprising switching means having a plurality of operating positions corresponding to a plurality of speed points for each motor, first and second magnetic amplifying means each connected to receive energization from a corresponding motor as a function of the speed thereof, first and second electro-dynamic brakes each operative to apply braking torque to a corresponding motor, said magnetic amplifying means having output terminals cross-connected to said brakes, and means responsive to operation of said switching means to at least one of the plurality of operating positions corresponding to the plurality of speed points for the first motor for rendering said first amplifier effective to energize said second brake to apply braking torque to the second motor through a predetermined range of speed of the first motor.

5. The combination according to claim 4 wherein the last mentioned means comprises means responsive to progressive operation of said switching means to said plurality of operating positions corresponding to said plurality of speed points for said first motor for shifting and changing said predetermined range of speed at which braking torque is applied to the second motor.

6. The combination according to claim 4 wherein the last mentioned means comprises means responsive to operation of said switching means to an operating position corresponding to the lowest speed point for the first motor for rendering said first amplifier effective to initiate energization of said second brake and to increase such brake energization as the first motor accelerates to a predetermined speed.

7. The combination according to claim 6 wherein said last mentioned means comprises means responsive to operation of said switching means to an operating position corresponding to a higher speed point for the first motor for rendering said first amplifier ineffective to energize said second brake until the speed of the first motor reaches a predetermined value and effective to increasingly energize said second brake with increasing speed above said predetermined value of speed.

8. In a barge control system comprising first and second polyphase wound-rotor induction motors for hauling a barge upstream and downstream, respectively, each motor having a secondary resistance network, means for establishing upstream and downstream power connections to the first and second motors, respectively, first and second electro-dynamic brakes each coupled to the shaft of the corresponding motor, first and second self-saturating magnetic amplifiers each having alternating current input, direct current bias and direct current signal control windings and having output terminals cross-connected to said electro-dynamic brakes, means for supplying the input winding with an alternating current voltage and the bias winding with a constant unidirectional voltage sufficient to turn said first amplifier full on, means in circuit with a portion of a phase branch of the secondary resistance network of the first motor and the signal winding of the first amplifier to supply the latter with a unidirectional voltage whose magnitude is a function of the first motor secondary current and of a polarity to develop ampere turns to oppose the ampere turns developed by said bias winding, control means comprising a multiposition controller operable in reverse directions, means responsive to operation of said controller to its first position in one direction for operating the first mentioned means to establish upstream power connections for the first motor, to render said second amplifier ineffective to energize said first brake coupled to the first motor shaft and to render the unidirectional voltage supplied by the third mentioned means effective upon said signal winding to develop an output from said first amplifier to energize said second brake coupled to the shaft of the second motor as a function of the speed of the first motor.

9. The combination according to claim 8 wherein the last mentioned means comprises means responsive to progressive operation of said controller to its second and further operating positions in said one direction for commutating predetermined portions of the secondary resistance network of the first motor in consecutive operating positions in said one direction and for rendering said unidirectional voltage supplied by said third mentioned means effective upon said signal winding to develop an output from said first amplifier to initiate energization of said second brake in proportion to the first motor secondary current when the motor speed reaches a predetermined value which changes for each further position beyond said second operating position.

10. In a system for hauling a load in different directions, in combination, a pair of induction motors, means connecting said motors to the load to afford hauling the latter in different directions, each of said motors having an electrodynamic brake comprising an energizing winding, means for initiating operation of a selected one of said motors and acceleration thereof to a predetermined speed, and means comprising a power amplifier for energizing the brake winding of the other motor as a function of the speed of said selected motor whereby a braking force is transmitted through the first mentioned means and the load to control the speed of said selected motor.

11. In a system for hauling a load in either of two different directions, in combination, a pair of induction motors, mechanical means connecting said motors to the load to afford hauling the latter alternately in two different directions, each motor having an electro-dynamic brake comprising an energizing winding, controller means, means responsive to operation of said controller means for initiating operation of a selected one of said motors to haul the load in a desired direction, and means comprising a magnetic amplifier in circuit with said selected motor and responsive to the speed of the latter for energizing the brake winding of the other motor whereby a braking force is applied through said mechanical means to the load and through the load to said selected motor.

12. In a system for moving a load selectively in opposite directions, in combination, first and second motors each having braking means and a load-connected line and motion translating apparatus for hauling in the corresponding line in response to motor operation in one direction of rotation and for paying out the corresponding line as the motor rotates in the other direction, a load, said lines being connected to opposite ends of said load for moving the latter in opposite directions, means for selectively energizing said first motor for operating the corresponding motion translating apparatus to haul in the corresponding line thereby to move said load in one of said directions, means responsive to energization of said first motor for controlling the braking means of said second motor as a function of the speed of said first motor, the braking action of said second motor controlling the paying out of the line by the corresponding translating apparatus during movement of said load and acting through said translating apparatus and said lines and said load upon said first motor, means for alternatively energizing said second motor for operating the corresponding motion translating apparatus to haul in the corresponding line thereby to move said load in the other of said directions, and means responsive to energization of said second motor for controlling the braking means of said first motor as a function of the speed of said second motor, the braking action of said first motor controlling the paying out of the line by the corresponding translating apparatus during movement of the load and acting through said translating apparatus and said lines and said load upon said second motor.

13. In a load control system for selectively hauling the load in either of two opposite directions, in combination, a first motor operable to haul the load in a first direction, a second motor operable to haul the load in a second direction, motion translating apparatus and a hauling line connecting each of said motors to the load so that when a selected motor is rendered operative the line associated therewith is reeled in and the line associated with the other motor is payed out, and control means for said motors for regulating the speed of the load and for maintaining the speed thereof at a selected value against an overhauling force, said control means comprising electro-responsive breaking means for each motor, means for energizing a selected one of said motors and for rendering the braking means of the selected motor ineffective, means responsive to operation of the selected motor for deriving an electrical signal therefrom as a function of the load thereon, and means responsive to said signal for rendering the braking means of the other motor effective to retard movement of the load.

14. In a system for hauling a load in different directions, in combination, two motors each having braking means, means for selectively energizing one or the other of said motors to move said load in one or the other of said different directions respectively, means for controlling the braking means of the unenergized motor as a function of the speed of the energized motor, and means for energizing the braking means of a selected one or both of said motors a predetermined amount to afford minimum braking thereof at all times.

15. The invention defined in claim 14, wherein said minimum braking means comprises a power supply source, and switching means for connecting said power supply source to the braking controlling means of the selected motor.

16. In a system for hauling a load in different directions, in combination, two alternating current induction motors each having a primary and a secondary winding and each further having an electromagnetic brake including an energizing winding operable when energized to brake the corresponding motor, means for selectively activating one or the other of said motors by energizing the primary winding thereof to move said load in one or the other of said different directions respectively, and means responsive to the current flowing in the secondary winding of the energized one of said motors for energizing the brake winding of the other motor thereby to cause predetermined braking of the latter and comprising two brake winding control devices one being connected to the secondary winding of each motor, and said control devices being cross-connected to the energizing windings of the brakes of the motors.

References Cited in the file of this patent
UNITED STATES PATENTS

| | | |
|---|---|---|
| 1,851,760 | Ellis | Mar. 29, 1932 |
| 1,931,107 | Dowell et al. | Oct. 17, 1933 |
| 2,071,168 | Kersting | Feb. 16, 1937 |
| 2,202,419 | Geuder | May 28, 1940 |
| 2,469,706 | Winther | May 10, 1949 |